(12) United States Patent
Brewster et al.

(10) Patent No.: US 11,365,071 B2
(45) Date of Patent: Jun. 21, 2022

(54) AUTOMATIC TUNING SYSTEM FOR PNEUMATIC MATERIAL CONVEYING SYSTEMS

(71) Applicant: IPEG, Inc, Cranberry Township, PA (US)

(72) Inventors: Doug Brewster, Harrisville, PA (US); Rich Shaffer, Portersville, PA (US); Max Rayburg, Lower Burrell, PA (US); Justin Weber, Pennsburg, PA (US); Mike Nguyen, Cranberry Township, PA (US)

(73) Assignee: IPEG, Inc, Cranberry Township, PA (US)

( * ) Notice: Subject to any disclaimer, the term of this patent is extended or adjusted under 35 U.S.C. 154(b) by 0 days.

(21) Appl. No.: 17/243,152

(22) Filed: Apr. 28, 2021

(65) Prior Publication Data

US 2021/0331877 A1    Oct. 28, 2021

Related U.S. Application Data

(60) Provisional application No. 63/016,552, filed on Apr. 28, 2020.

(51) Int. Cl.
*B65G 53/66*  (2006.01)
*B65G 53/24*  (2006.01)

(52) U.S. Cl.
CPC .............. *B65G 53/66* (2013.01); *B65G 53/24* (2013.01); *B65G 2203/042* (2013.01)

(58) Field of Classification Search
CPC ........ B65G 53/24; B65G 53/26; B65G 53/28; B65G 53/50; B65G 53/66; B65G 47/19;
(Continued)

(56) References Cited

U.S. PATENT DOCUMENTS

| | | | | |
|---|---|---|---|---|
| 2,583,648 A | * | 1/1952 | Hensley | B65G 53/24 406/32 |
| 3,167,359 A | * | 1/1965 | Aller | B65G 53/24 406/31 |

(Continued)

*Primary Examiner* — Joseph A Dillon, Jr.
(74) *Attorney, Agent, or Firm* — Paul D Bangor, Jr.; Clark Hill PLC

(57) ABSTRACT

A material conveying system, comprising: one or more material sources for providing material to be transferred; one or more destination locations for receiving material from the one or more material sources; one or more material conveying lines; one or more vacuum pumps wherein each vacuum pump is operatively connected to one or more of the one or more destination locations via one or more vacuum source lines; a sensor disposed on, in or near each of the one or more material conveying lines; a programmable electronic control unit (ECU) connected, via wires or wirelessly, to each component of the material conveying system including the one or more material sources, the one or more destination locations, the one or more vacuum pumps and to the one or more sensors; wherein the ECU uses data from the one or more sensors to (i) determine flow patterns and/or stream density of the material being conveyed through the one or more material conveying lines; and (ii) make automatic adjustments for optimizing and maintaining the material flow patterns in the one or more material conveying lines based on data provided by the one or more sensors.

14 Claims, 2 Drawing Sheets

(58) Field of Classification Search
CPC ............ B65G 2816/08; B65G 2201/04; B65G 2201/042; B65G 2203/042; B23P 19/005; B65D 88/548
USPC ....... 406/10, 14, 28, 34, 122, 151, 152, 197, 406/198
See application file for complete search history.

(56) References Cited

U.S. PATENT DOCUMENTS

| | | | | |
|---|---|---|---|---|
| 3,671,079 | A * | 6/1972 | Doe | B65G 53/24 406/137 |
| 4,005,908 | A * | 2/1977 | Freeman | B65G 53/28 406/25 |
| 4,341,492 | A * | 7/1982 | Montgomery, Jr. | F04F 1/06 119/442 |
| 4,480,947 | A * | 11/1984 | Nagasaka | G01F 1/74 406/14 |
| 4,490,077 | A * | 12/1984 | Shimada | G01F 1/74 406/124 |
| 4,521,139 | A * | 6/1985 | Kretschmer | B65G 53/66 406/19 |
| 4,525,107 | A * | 6/1985 | Feldsted | B63B 27/24 406/109 |
| 4,900,200 | A * | 2/1990 | Harumoto | B65G 53/26 406/106 |
| 5,098,667 | A * | 3/1992 | Young | B01J 8/001 137/4 |
| 5,575,596 | A * | 11/1996 | Bauer | B65G 53/24 406/168 |
| 5,882,149 | A * | 3/1999 | DeWitt | G01F 1/74 406/56 |
| 6,786,681 | B2 * | 9/2004 | Grasshoff | B65G 53/28 406/11 |
| 8,157,483 | B2 * | 4/2012 | Volkmann | B65G 53/526 406/168 |
| 8,360,691 | B2 * | 1/2013 | Moretto | B65G 53/66 406/17 |
| 8,807,879 | B2 * | 8/2014 | Toner | B01D 45/04 435/174 |
| 8,858,123 | B2 * | 10/2014 | Schmit | F23K 3/02 406/24 |
| 8,899,884 | B2 * | 12/2014 | Kretschmer | F27D 3/10 406/10 |
| 8,926,907 | B2 * | 1/2015 | Albin | C10G 11/187 422/110 |
| 9,745,149 | B2 | 8/2017 | Brewster et al. | |
| 10,227,186 | B2 * | 3/2019 | De Jager | A24C 5/392 |
| 10,696,496 | B2 * | 6/2020 | Ellis | B65G 53/521 |
| 2003/0185635 | A1 * | 10/2003 | Van Dorst | B65G 53/66 406/10 |
| 2010/0303559 | A1 * | 12/2010 | Sundholm | B65F 5/005 406/122 |
| 2011/0232547 | A1 * | 9/2011 | Schmit | F23K 3/02 110/263 |
| 2014/0348597 | A1 * | 11/2014 | Moretto | B65G 43/08 406/31 |
| 2015/0232288 | A1 * | 8/2015 | De Jager | B65G 53/24 131/108 |
| 2016/0244275 | A1 | 8/2016 | Maguire | |
| 2016/0272439 | A1 * | 9/2016 | Kelly | B65G 53/528 |
| 2018/0210435 | A1 * | 7/2018 | Zhang | G05B 19/44 |

* cited by examiner

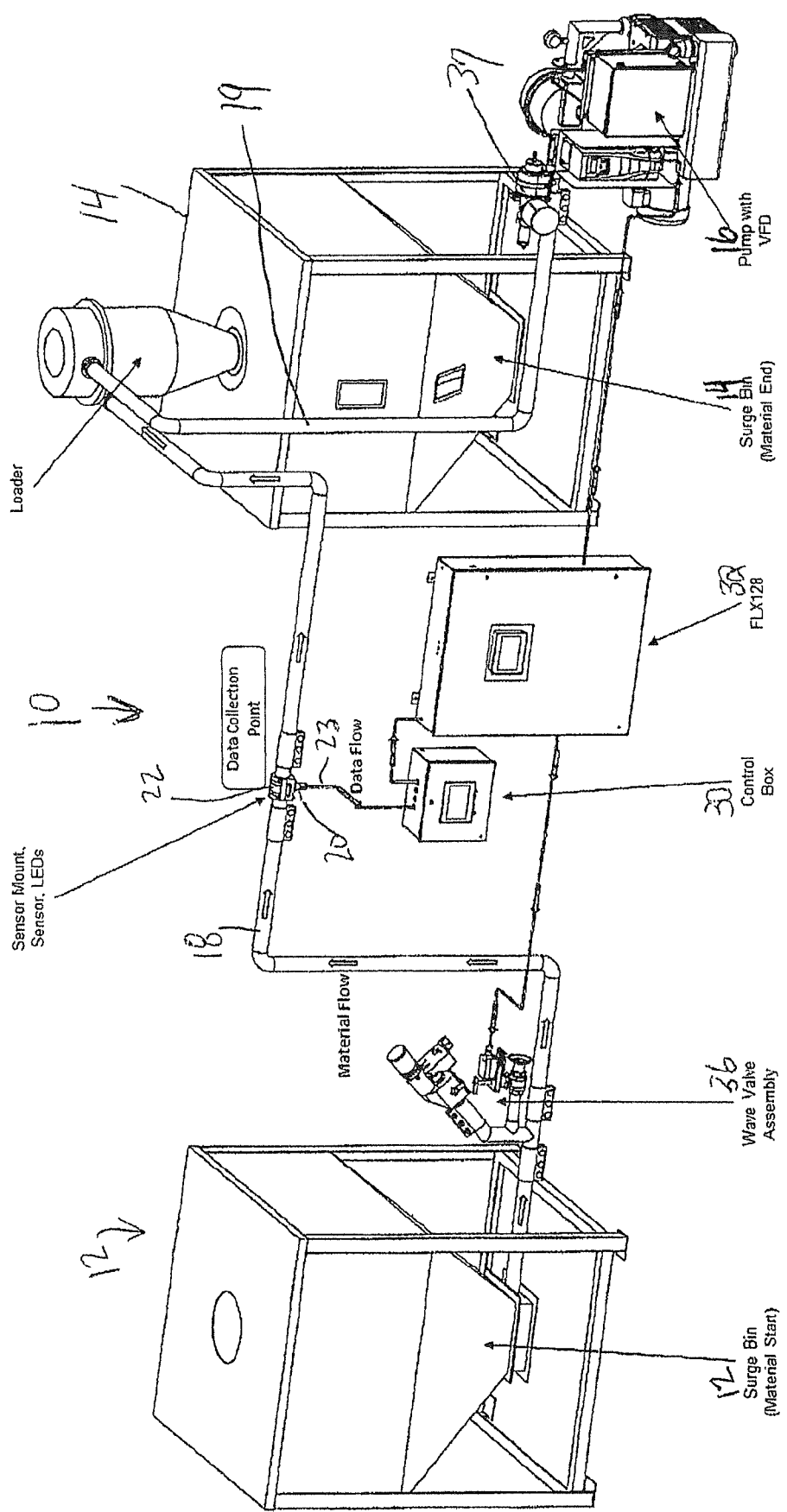

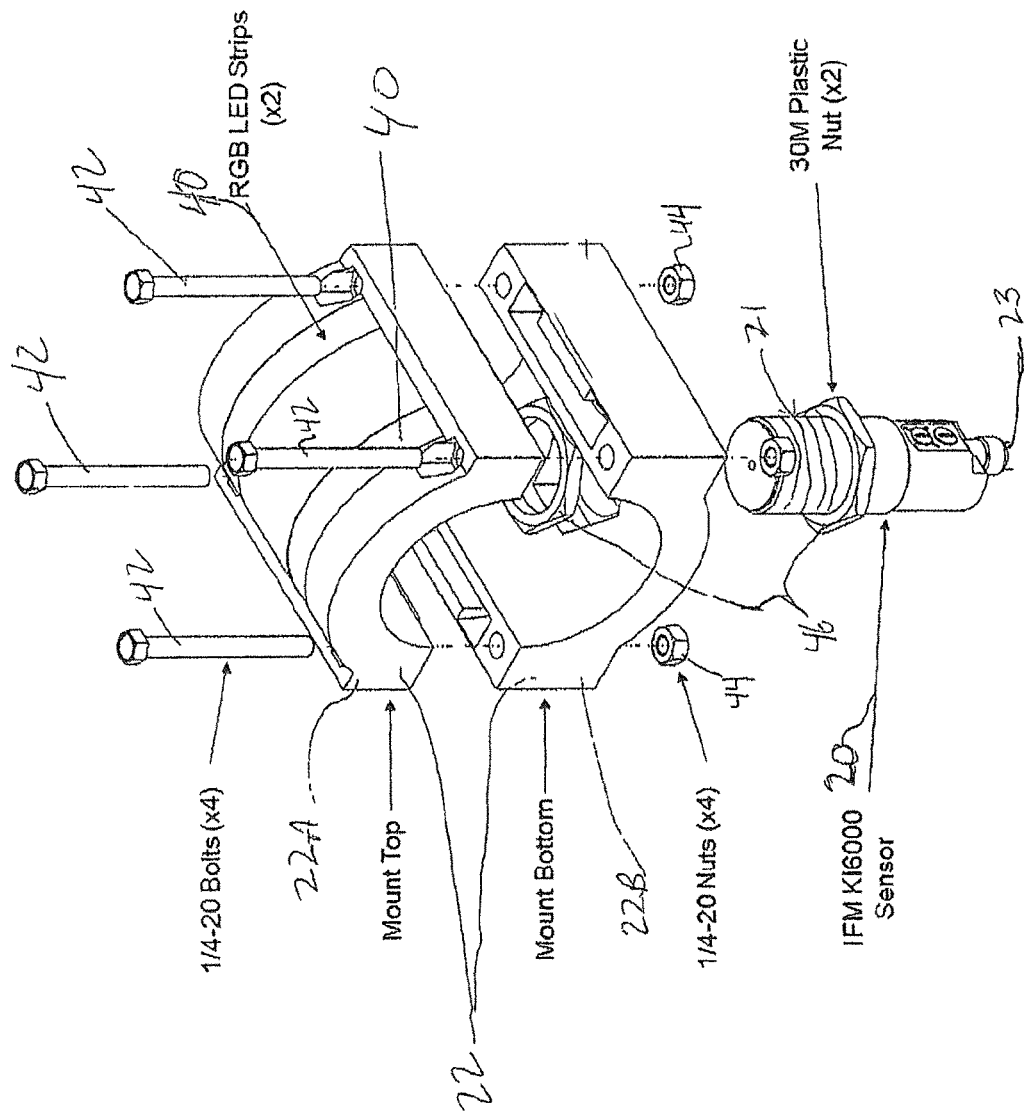

AUTOMATIC TUNING SYSTEM FOR PNEUMATIC MATERIAL CONVEYING SYSTEMS

RELATED APPLICATION

This application claims priority benefit under 35 U.S.C. § 119(e) of U.S. Provisional Application No. 63/016,552 filed Apr. 28, 2020 the contents of which are herein incorporated by reference.

FIELD OF THE DISCLOSURE

Technical Field

The present disclosure generally relates to the field of pneumatic material conveying systems and methods.

Background

Traditionally, pneumatic conveying systems can vary from changes in particle geometry, material density, leaking pipe, moisture levels, environmental conditions, heat, moisture, dirt and dust accumulating on and impregnating the air filters. These conditions often require operators to stop, check, clean and make manual adjustments to re-establish optimum conveying flow. The system electronic control unit (ECU) of the present disclosure will automatically make corrections to work within the defined material flow range. Preferably, the system electronic control unit (ECU) of the present disclosure can be used in either intermittent or continuous pneumatic conveying or both at different times in the operation of the conveying system.

The system of the present disclosure solves the problem of manually adjusting material conveying transfer systems and changing flow patterns as a result of material variations, environmental conditions, material particle physical sizes that can require a system to be adjusted manually.

BRIEF SUMMARY OF THE DISCLOSURE

In a preferred aspect, the present disclosure comprises a material conveying system, comprising: one or more material sources for providing material to be transferred; one or more destination locations for receiving material from the one or more material sources; one or more material conveying lines; one or more vacuum pumps wherein each vacuum pump is operatively connected to one or more of the one or more destination locations via one or more vacuum source lines; a sensor disposed on, in or near each of the one or more material conveying lines; a programmable electronic control unit (ECU) connected, via wires or wirelessly, to each component of the material conveying system including the one or more material sources, the one or more destination locations, the one or more vacuum pumps and to the one or more sensors; wherein the ECU uses data from the one or more sensors to (i) determine flow patterns and/or stream density of the material being conveyed through the one or more material conveying lines; and (ii) make automatic adjustments for optimizing and maintaining the material flow patterns in the one or more material conveying lines based on data provided by the one or more sensors.

In another preferred aspect of a material conveying system of the present disclosure, the ECU uses data from the one or more sensors to make changes to optimize the hertz setting for the one or more pumps and/or one or more control valves of the system to maintain the material flow pattern without manual operator interference or adjustment.

In yet another preferred aspect of a material conveying system of the present disclosure, each of the one or more sensors comprises a capacitive sensor.

In another preferred aspect of a material conveying system of the present disclosure, the material consists of powders, granules, dry plastics, plastic pellets, plastic granules, recycled materials or pharmaceuticals.

In an additional preferred aspect of a material conveying system of the present disclosure, the one or more sensors is/are selected from the group of flow meters, material density sensors, vacuum sensors, pressure sensors, vibration sensors and acoustic sensors.

In another preferred aspect of a material conveying system of the present disclosure, the one or more sensors provide data to the ECU to monitor stream density of material flow pulses in the one or more material lines.

In yet another preferred aspect of a material conveying system of the present disclosure, the one or more sensors provide data to the ECU to monitor pulse frequency of material flow pulses in the one or more material lines.

In another preferred aspect of a material conveying system of the present disclosure, the one or more sensors provide data to the ECU on gas pressure in the one or more material conveying lines including negative or positive pressure values.

Many other variations are possible with the present disclosure, and those and other teachings, variations, and advantages of the present disclosure will become apparent from the description and figures of the disclosure.

BRIEF DESCRIPTION OF THE DRAWINGS

For the present disclosure to be easily understood and readily practiced, the present disclosure will now be described for purposes of illustration and not limitation in connection with the following figures, wherein:

FIG. 1 is a schematic showing various components of a preferred embodiment of an automatic tuning system for a pneumatic material conveying system of the present disclosure;

FIG. 2 is an exploded view of a preferred sensor and sensor mount used in a preferred embodiment of the automatic tuning system for a pneumatic material conveying system of the present disclosure.

DETAILED DESCRIPTION OF PREFERRED EMBODIMENTS

In the following detailed description, reference is made to the accompanying examples and figures that form a part hereof, and in which is shown, by way of illustration, specific embodiments in which the inventive subject matter may be practiced. These embodiments are described in sufficient detail to enable those skilled in the art to practice them, and it is to be understood that other embodiments may be utilized and that structural or logical changes may be made without departing from the scope of the inventive subject matter. Such embodiments of the inventive subject matter may be referred to, individually and/or collectively, herein by the term "disclosure" merely for convenience and without intending to voluntarily limit the scope of this application to any single inventive concept if more than one is in fact disclosed.

The following description is, therefore, not to be taken in a limited sense, and the scope of the inventive subject matter is defined by the appended claims and their equivalents.

Referring to FIG. 1, one embodiment of a preferred automatic tuning system for a pneumatic material conveying system of the present disclosure comprises a pneumatic material conveying system with an automatic tuning system 10. In system 10, bulk material is transferred from source locations 12 to destination locations 14 through the use of one or more vacuum sources or pumps 16. The bulk material may be in the form of powders, granules, and dry bulk material such as ash, beans, cement, corn cobs, corn, corn flakes, plastics, sand, and wheat. The source locations 12 may be one or more drums, bins, silos, or other vessels that hold or delivers source material. The destination locations 14 may be one or more hoppers, loaders and/or manifolds intended to receive source material. The material travels from a selected source location 12 to a selected destination location 14 through conveying tubes 18. While FIG. 1 shows a system having only one material start point 12 and end point 14 with associated electrical control unit (ECU) 32, control box 30, material line 18, vacuum line 19, sensor 20 and valves 36, 37, the present disclosure encompasses various embodiments of pneumatic material conveying systems having multiples of such components, as well as other components such as manifolds for directing a plurality of conveyed materials to various system locations.

According to the present disclosure, a preferred pneumatic material conveying system with an automatic tuning system 10 uses a sensor 20 mounted in conveying tube 18 using a sensor mount/housing 22. Sensor 20 and/or its associated electrical control unit (ECU) 32, preferably recognizes flow patterns and stream density of the material being conveyed through the material conveying lines 18. The system electrical control unit (ECU) 32 will make automatic adjustments for optimizing and maintaining the desired material flow pattern based on data provided by sensor 20. The pneumatic material conveying system with automatic tuning system 10 of the present disclosure can be used for plastic pellets and granules, powders, recycled and regrind materials, food products, pharmaceuticals, and materials transferred using positive or negative gas pressure. The system ECU 32 and system software will keep the intended flow pattern within a desired optimum range that is based on monitoring material movement inside the material line 18. This system 10 will monitor material flow patterns from the sensors 20 then make changes to optimize the hertz setting for pumps 16 and the settings of control valves 36 to maintain the best material flow pattern without manual operator interference or adjustment.

The system 10 preferably will utilize sensors 20 or other devices such as dedicated flow meters, material density sensors, vacuum sensors, pressure sensors, vibration sensors and/or acoustic sensors to determine the flow density and/or other parameters of the material moving in the material conveying lines 18 and/or of system 10. The system 10 with ECU 32 preferably may adjust the hertz level of pumps 16 and may adjust the control valves 36, 37 for a desired conveying pattern without damaging the transported material in line 18. The system 10 may also preferably monitor system gas pressure and include negative or positive pressure values as an additional parameter to the ECU 32. Monitoring gas pressure, however, is not a requirement for system 10 to function.

Adjusting parameters of system 10 based on feedback from sensor(s) 20 in material line 18 sensors will provide ECU 32 input to adjust and tune the material flow pattern inside the material conveying lines 18. Manual operator adjustments for tuning will not be required but can be made using control box 30. System 10 of the present disclosure eliminates the trial and error method of setting system parameters at setup and throughout operation of the material conveying system but instead allows for automatic flow pattern monitoring and tuning of the pneumatic material conveying system.

Preferably, the Hertz adjustment range for pumps 16 of system 10 is between 25 hertz and 100 hertz. The airflow range for valves 36, 37 is preferably between 0 and 100% and may be operated using a servo or other type of motion control device. The system 10 preferably monitors the material flow pulses in material lines 18 and provides feedback to the ECU 32 on stream density and pulse frequency.

During operation of conveying system 10 many problems can occur that negatively affect the performance of conveying system 10. Examples are leaks in the vacuum lines 19, leaks in the material lines 18, leaks in valves 36, 37, vacuum lines 19 and/or material lines 18, filter cleanliness, pump seals, leaks in dust collector seals, and obstructions in material lines 18 and vacuum lines 19. Because of the variety of potential problems, the expansiveness of the pneumatic conveying system 10, and the difficulty accessing the system components which are normally installed above all other equipment in the factory since troubleshooting may be very tedious.

As shown in FIG. 2, the system 10 preferably will utilize one or more sensors 20 mounted in mount/housing 22. Preferably, sensors 20 comprise a capacitive sensor, such as a KI6000-KI-3250NFPKG/PL/2P/US/IO from IFM electronic which has an M30×1.5 plastic thread 21 and an operating voltage of 10-30 V DC. Preferably, the output function of sensor 20 can be easily changed from NO to NC via a selector switch. The operating distance of the capacitive sensor 20 is preferably 25 mm and can be adjusted between 0.5-40 mm with a non-flush installation. A unique 12-digit LED bar display 40 preferably serves as an adjustment aid for easy switch point adjustment of sensor 20, which also helps when readjusting in case of deposits. The electrical connection 23 of the capacitive sensor 20 is preferably via an M12 connector. Thanks to the increased interference immunity and protection rating of IP65/IP67/IP69K, the sensor 20 can be used in virtually all applications. Using a computer or ECU 32, sensor 20 can also be programmed via IO-Link, with which advanced features such as timers or PNP/NPN switching are made available to the user.

Preferably, mount/housing 22 for sensor 20 has a top mount 22A and a bottom mount 22B connected together via bolts 42 and nuts 44. M30 plastic nuts 46 are preferably used for mounting sensor 20 in mount/housing 22.

In the foregoing Detailed Description, various features are grouped together in a single embodiment to streamline the disclosure. This method of disclosure is not to be interpreted as reflecting an intention that the claimed embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A material conveying system, comprising:
   one or more material sources for providing material to be transferred;

one or more destination locations for receiving material from the one or more material sources;

one or more material conveying lines;

one or more vacuum pumps wherein each vacuum pump is operatively connected to one or more of the one or more destination locations via one or more vacuum source lines;

a sensor disposed on, in or near each of the one or more material conveying lines;

a programmable electronic control unit (ECU) connected, via wires or wirelessly, to each component of the material conveying system including the one or more material sources, the one or more destination locations, the one or more vacuum pumps and to the one or more sensors;

wherein the ECU uses data from the one or more sensors to (i) determine flow patterns of the material being conveyed through the one or more material conveying lines; and (ii) make automatic adjustments for optimizing and maintaining the material flow patterns in the one or more material conveying lines based on data provided by the one or more sensors.

2. The system of claim 1, wherein the ECU uses data from the one or more sensors to make changes to optimize the hertz setting for the one or more pumps and/or one or more control valves of the system to maintain the material flow pattern without manual operator interference or adjustment.

3. The system of claim 1, wherein each of the one or more sensors comprises a capacitive sensor.

4. The system of claim 1, wherein the material consists of powders, granules, dry plastics, plastic pellets, plastic granules, recycled materials or pharmaceuticals.

5. The system of claim 1, wherein the one or more sensors is/are selected from the group of flow meters, material density sensors, vacuum sensors, pressure sensors, vibration sensors and acoustic sensors.

6. The system of claim 1, wherein the one or more sensors provide data to the ECU to monitor stream density of material flow pulses in the one or more material lines.

7. The system of claim 1, wherein the one or more sensors provide data to the ECU to monitor pulse frequency of material flow pulses in the one or more material lines.

8. The system of claim 3, wherein the one or more sensors provide data to the ECU to monitor stream density of material flow pulses in the one or more material lines.

9. The system of claim 3, wherein the one or more sensors provide data to the ECU to monitor pulse frequency of material flow pulses in the one or more material lines.

10. The system of claim 5, wherein the one or more sensors provide data to the ECU to monitor stream density of material flow pulses in the one or more material lines.

11. The system of claim 5, wherein the one or more sensors provide data to the ECU to monitor pulse frequency of material flow pulses in the one or more material lines.

12. The system of claim 1, wherein the one or more sensors provide data to the ECU on gas pressure in the one or more material conveying lines including negative or positive pressure values.

13. The system of claim 3, wherein the one or more sensors provide data to the ECU on gas pressure in the one or more material conveying lines including negative or positive pressure values.

14. The system of claim 5, wherein the one or more sensors provide data to the ECU on gas pressure in the one or more material conveying lines including negative or positive pressure values.

* * * * *